United States Patent
Atarashi et al.

(10) Patent No.: US 7,668,066 B2
(45) Date of Patent: Feb. 23, 2010

(54) OPTICAL PICKUP APPARATUS

(75) Inventors: Yuichi Atarashi, Hachioji (JP); Kohei Ota, Hachioji (JP); Junji Hashimura, Sagamihara (JP); Kiyono Ikenaka, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 90 days.

(21) Appl. No.: 11/663,299

(22) PCT Filed: Nov. 6, 2006

(86) PCT No.: PCT/JP2006/022089

§ 371 (c)(1),
(2), (4) Date: Mar. 21, 2007

(87) PCT Pub. No.: WO2007/055167

PCT Pub. Date: May 18, 2007

(65) Prior Publication Data
US 2009/0196147 A1 Aug. 6, 2009

(30) Foreign Application Priority Data
Nov. 8, 2005 (JP) .............................. 2005-323296

(51) Int. Cl.
*G11B 7/00* (2006.01)
(52) U.S. Cl. ............................ 369/112.24; 369/112.05; 369/112.16
(58) Field of Classification Search .................. None
See application file for complete search history.

(56) References Cited

U.S. PATENT DOCUMENTS

| | | | | |
|---|---|---|---|---|
| 2004/0213131 A1* | 10/2004 | Kimura et al. | .......... | 369/112.03 |
| 2006/0002247 A1* | 1/2006 | Kim et al. | ................ | 369/44.11 |
| 2006/0007812 A1* | 1/2006 | Nishi et al. | .............. | 369/44.37 |

* cited by examiner

*Primary Examiner*—Joseph H Feild
*Assistant Examiner*—Christopher R Lamb
(74) *Attorney, Agent, or Firm*—Finnegan, Henderson, Farabow, Garrett & Dunner, L.L.P.

(57) ABSTRACT

An optical pickup apparatus for information recording and/or reproduction on different optical information recording media with compatibility among these media, the optical surface of a first objective lens and the optical surface of a second objective lens are formed only of a refractive surface. The second objective lens is used in common for the first light flux with a wavelength of λ1 and the second light flux with a wavelength of λ2, but in the case where the protective substrate t2 of the second optical information recording medium and the protective substrate t3 of the third optical information recording medium are the same, it is not necessary to take the difference in thickness of the protective substrate into consideration. Chromatic aberration based on the difference in wavelength between the first light flux and the second light flux can be corrected by displacing the second coupling lens.

16 Claims, 1 Drawing Sheet

FIG. 1

OPTICAL PICKUP APPARATUS

TECHNICAL FIELD

The present invention relates to optical pickup apparatuses, and particularly to optical pickup apparatuses that can record and/or reproduce information in different optical information recording media.

BACKGROUND ART

In recent years, in optical pickup apparatuses, the wavelength of the laser light is becoming progressively shorter in the laser light source used as the light source for reproducing the information recorded in optical disks or for recording information in optical disks, and for example, laser light sources of wavelengths of 400 nm to 420 nm are being realized such as blue-violet semiconductor lasers, blue SHG laser using wavelength conversion of infrared laser source using the second harmonic wave, etc.

If these blue-violet laser light sources are used, in the case in which an objective lens with the same numerical aperture (NA) as a DVD (Digital Versatile Disk), for an optical disk with a diameter of 12 cm, recording of 5 GB to 20 GB of information is possible, and when the NA of the objective lens is increased to 0.85, for an optical disk with a diameter of 12 cm, recording of 23 GB to 25 GB of information becomes possible. In the following, in the present patent specification, optical disks and magneto-optical disks using a blue-violet laser light source are collectively called "High Density Optical Disks".

By the way, two standards have been proposed for high density optical disks at present. One is the Blu-ray disk (hereinafter abbreviated as BD) which uses an objective lens of an NA of 0.85 and has a protective substrate thickness of 0.1 mm, and the other is the HD DVD (hereinafter abbreviated as HD) which uses an objective lens of an NA of 0.65 to 0.67 and has a protective substrate thickness of 0.6 mm. Further, at present, DVDs or CDs with various types of information recorded in them are being marketed. In view of this current state of affairs, optical pickup apparatuses that carry out recording and/or reproduction of information for different optical disks have been proposed in Patents Documents 1 and 2.

Patent Document 1: International disclosure No. 03/91764 pamphlet

Patent Document 2: Japanese Unexamined Patent Application Publication No. 2005-209299

DISCLOSURE OF INVENTION

Problems to be Solved by the Invention

However, since the thicknesses of the protective substrate provided on the information recording surface of BD, HD and DVD, and CD are different being t1=0.1 mm, t2=t3=0.6 mm, and t4=1.2 mm, respectively, if the specifications are determined so that focusing is done optimally for any one of the optical disks using a common objective lens, in the focusing for other optical disks, there is the problem that spherical aberration occurs that is caused by the thickness of the protective substrate. For this, at the time of carrying out information recording and/or reproduction for different optical disks, since it is possible to use light beam of different wavelengths, by providing a optical path difference according to the wavelength using an optical path difference causing structure formed in the objective lens, it is possible to correct for the spherical aberration caused by the thickness of the protective substrate. However, an optical path difference causing structure typified by a diffraction structure is one that forms very fine steps according to the wavelength of the incident light beam, and if this is provided on an objective optical element made of glass, there is the problem that it increases the cost.

On the other hand, when an objective optical element is formed using a plastic, by preparing a mold having very fine steps and then carrying out extrusion forming, etc., using that mold, it is possible to mass manufacture relatively easily an objective optical element having a diffraction structure. However, when an objective optical element is formed using a plastic, since in general the changes in the refractive index with respect to changes in the temperature are high, there are cases when it is difficult to use in optical pickup apparatuses in which the environmental temperature changes by a large amount.

The present invention was made in view of these problems, and the purpose of the present invention is to provide an optical pickup apparatus that has a relatively simple configuration and can record and/or reproduce information with compatibility possible with different optical information recording media.

Means to Solve the Problems

An optical pickup apparatus of claim 1 comprises: a first light source to emit a light flux with a wavelength $\lambda 1$;

a second light source to emit a light flux with a wavelength $\lambda 2$ ($\lambda 1 < \lambda 2$);

a first objective optical element provided with an optical surface consisting of a refractive surface;

a second objective optical element provided with an optical surface consisting of a refractive surface;

wherein the first light flux with the wavelength $\lambda 1$ emitted from the first light source is converged by the first objective optical element, and a converged light spot can be formed on an information recording surface of a first optical information recording medium with a protective substrate thickness t1, and also the first light flux with the wavelength $\lambda 1$ emitted from the first light source is converged by the second objective optical element, and a converged light spot can be formed on an information recording surface of a second optical information recording medium with a protective substrate thickness of t2 (t2>t1), and further the second light flux with the wavelength of $\lambda 2$ emitted from the second light source is converged by the second objective optical element, and a converged light spot can be formed on the information recording surface of a third optical information recording medium having a protective substrate thickness of t3 ($0.9t2 \leq t3 \leq 1.1t2$) and a track pitch which is larger than that of the second optical information recording medium;

wherein the optical pickup apparatus further comprising:

a first optical path which leads the first light flux to the first objective optical element;

a second optical path which leads the first light flux to the second objective optical element; and a third optical path which leads the second light flux to the second objective optical element;

wherein the first optical path that is provided between the first light source and the first objective optical element has a polarized beam switching means and a first polarized beam splitter;

the second optical path that is provided between the first light source and the second objective optical element has the polarized beam switching means, the first polarized beam splitter, a wavelength selective element, and an aberration correction mechanism;

the third optical path that is provided between the second light source and the second objective optical element has the wavelength selective element, and the aberration correction mechanism; and wherein when converged light spot formation is performed on the information recording surface of the first optical information recording medium via the first objective optical element using the first light flux, the first light flux emitted from the first light source is put in the first polarized state by the polarized beam switching means by being passed through the first polarized beam splitter and entered into the first objective optical element;

wherein when converged light spot formation is performed on the information recording surface of the second optical information recording medium via second objective optical element using the first light flux, by putting the first light flux emitted from the first light source in the second polarized state using the polarized beam switching means, the first light flux is reflected at the first polarized beam splitter and then reflected at the wavelength selective element, and then put in a first aberration state by being passed through the aberration correcting mechanism and then entered into the second objective optical element;

wherein when converged light spot formation is performed on the information recording surface of the third optical information recording medium via second objective optical element using the second light flux, by passing the second light flux emitted from the second light source through the wavelength selective element and then through the aberration correction mechanism, the second light flux is put in a second aberration state and then entered into the second objective optical element, and wherein when a parallel light flux with a wavelength $\lambda 3$ ($1.7\lambda 1 \leq \lambda 3 \leq 2.3\lambda 1$) is made to be incident on the second objective optical element, the wavefront aberration is $0.07\lambda 3$ rms or more in the converged light spot formed on an information recording surface of a fourth information recording medium in which the protective substrate thickness is t4 (t4>t3) and the track pitch is larger than that of the third information recording medium.

In the present invention, by forming the optical surface of the first objective optical element and the second objective optical element only from refraction surface, it can be made at a low cost even when made from glass. Furthermore, the first objective optical element can be optimized and set for the first light flux and the protective substrate t1 of the first light information recording medium, and thus recording and/or reproduction of information can be performed suitably on the first information recording medium. Meanwhile, in the case where the protective substrate t2 of the second optical information recording medium and the protective substrate t3 of the third optical information recording medium are the same, it is not necessary to take the difference in thickness of the protective substrate into consideration, and thus designing becomes simple and cost is low. It is to be noted that chromatic aberration based on the difference in wavelength between the first light flux and the second light flux is corrected by putting the light flux that is passed through the optical aberration element by a mechanism for correcting aberration into a suitable aberration state. Furthermore, the mechanism for correcting aberration may be one which also corrects other factors. It is preferable that the structure is such that other factors such as difference in oscillation wavelength of each laser diode (so-called wavelength characteristics) due to manufacturing lots or correction of aberration caused by increase in temperature during use (temperature correction) is performed.

It is to be noted that the mechanical type polarized switching means will described in the embodiments hereinafter, but an electricity control semiconductor switch is known in which the light polarization state can be switched into orthogonal linear polar light using the method of applying half wavelength voltage to an electric optical crystal for example. In addition, to the electric optical crystal, one using a molecular film is known and switching of the polarized state for a plurality of wavelength regions can be done separately at a suitably selected timing by selecting and adjusting the materials and combinations of the molecular films.

The optical pickup apparatus of Claim 2 comprises: a first light source to emit a light flux with a wavelength $\lambda 1$;

a second light source to emit a light flux with a wavelength $\lambda 2$ ($\lambda 1 < \lambda 2$);

a first objective optical element provided with an optical surface consisting of a refractive surface;

a second objective optical element provided with an optical surface having a diffractive surface, and the first light flux with the wavelength $\lambda 1$ emitted from the first light source is converged by the first objective optical element, and a converged light spot can be formed on an information recording surface of a first optical information recording medium with a protective substrate thickness of t1 and also the first light flux with the wavelength $\lambda 1$ emitted from the first light source is converged by the second objective optical element, and a converged light spot can be formed on an information recording surface of a second optical information recording medium with a protective substrate thickness t2 (t2>t1), and further the second light flux with the wavelength $\lambda 2$ emitted from the second light source is converged by the second objective optical element, and a converged light spot can be formed on an information recording surface of a third optical information recording medium having a protective substrate thickness t3 ($0.9t2 \leq t3 \leq 1.1t2$) and a track pitch which is larger than that of the second information recording medium;

wherein the optical pickup apparatus further comprising:

a first optical path which leads the first light flux to the first objective optical element;

a second optical path which leads the first light flux to the second objective optical element; and a third optical path which leads the second light flux to the second objective optical element; wherein the first optical path that is provided between the first light source and the first objective optical element has a polarized beam switching means and a first polarized beam splitter;

the second optical path that is provided between the first light source and the second objective optical element has the polarized beam switching means, the first polarized beam splitter, a wavelength selective element, and a aberration correcting mechanism;

the third optical path that is provided between the second light source and the second objective optical element has a wavelength selective element, and the aberration correcting mechanism; and wherein when converged light spot formation is performed on the information recording surface of the first optical information recording medium via the first objective optical element using the first light flux, by putting the first light flux emitted from the first light source in the first polarized state using the polarized beam switching means, the first light flux enters into the first objective optical element via the first polarized beam splitter;

wherein when converged light spot formation is performed on the information recording surface of the second optical information recording medium via second objective optical element using the first light flux, by putting the first light flux emitted from the first light source in the second polarized state using the polarized beam switching means, the first light flux is reflected at the first polarized beam splitter and then reflected at the wavelength selective element, and then put in the first aberration state by being passed through the aberration correcting mechanism and then entered into the second objective optical element;

wherein when converged light spot formation is performed on the information recording surface of the third optical information recording medium via second objective optical element using the second light flux, by passing the second light flux emitted from the second light source through the wavelength selective element and then through the aberration correcting mechanism, the second light flux is put in a second aberration state and then entered into the second objective optical element, and wherein when a parallel light flux with a wavelength $\lambda 3$ ($1.7\lambda 1 \leq \lambda 3 \leq 2.3\lambda 1$) is made to be incident on the second objective optical element, the wavefront aberration is $0.07\lambda 3$ rms or more in the converged light spot formed on an information recording surface of a fourth information recording medium in which the protective substrate thickness is t4 (t4>t3) and the track pitch is larger than that of the third information recording medium.

In the present invention, the first objective optical element is formed from only a refractive surface, and a diffractive surface is provided on the optical surface of the second objective optical element. As a result, by forming the objective lens which is thrust from only the refractive surface for an optical disk with higher density, even when made of glass, it can be formed at a reduced cost. Furthermore, the first objective optical element can be designed so as to be optimized for the first light flux and the protective substrate t1 of the first optical information recording medium, and thus recording and/or reproduction of information can be performed suitably on the first optical information recording medium. Meanwhile, the second optical information recording medium is used in common for the first light flux and the second light flux, but in the case where the protective substrate t2 of the second optical information recording medium and the protective substrate t3 of the third optical information recording medium are the same, it is not necessary to take the difference in thickness of the protective substrate into consideration, and thus designing becomes simple and cost is low. It is to be noted that, chromatic aberration based on the difference in wavelength between the first light flux and the second light flux can be suitably corrected using a diffraction structure that is provided in the second objective optical element by imparting a suitable aberration state to the light flux. Furthermore, the mechanism for correcting aberration may be one which: corrects chromatic aberration beyond that corrected by the diffraction structure in the second optical element, as well as one which also corrects other factors. A structure is possible in which other factors such as correction of difference in oscillation wavelength of each laser diode (so-called wavelength characteristics) due to manufacturing lots or correction of aberration caused by increase in temperature during use (temperature correction) is favorably performed.

The optical pickup apparatus of Claim 3 is an optical pickup apparatus according to the invention of Claim 1 or Claim 2, wherein a first polarization conversion element is provided between the first polarized beam splitter and the first objective optical element in the first optical path;

a second polarized beam splitter is provided between the wavelength selecting element and the second objective optical element, and a second polarization conversion element is provided between the second polarized beam splitter and the second objective optical element in the second optical path and the third optical path;

the light flux emitted from the second light source is in the first polarized state; and when converged light spot formation is performed on the information recording surface of the first optical information recording medium via the first objective optical element using the first light flux, the first light flux reflected from the information recording surface of the first information recording medium is put into the second polarized state by a first polarization conversion element and then reflected at the first polarized beam splitter and entered into the first optical detector;

when focus spot formation is performed on the information recording surface of the second optical information recording medium via the second objective optical element using the first light flux, the light flux reflected from the information recording surface of the second objective optical element is put into the first polarized state by being passed through the second polarization conversion element and then reflected at the second polarized beam splitter and entered into the second optical detector; and when focus spot formation is performed on the information recording surface of the third optical information recording medium via the second objective optical element using the second light flux, the light flux reflected from the information recording surface of the second objective optical element is put into the first polarized state by being passed through the second polarization conversion element and then reflected at the second polarized beam splitter and entered into the second optical detector.

The optical pickup apparatus of Claim 4 is the invention of any one of Claims 1 to 3, wherein, because the mechanism for correcting aberration includes a coupling lens which displaces in the optical axis direction, the angle of divergence (or convergence angle) of the light flux which passes through is changed to thereby correct aberration based on wavelength difference of the first light flux and the second light flux.

The optical pickup apparatus of Claim 5 is the invention of any one of Claims 1 to 4, wherein, because the mechanism for correcting aberration includes a diffraction structure which is formed on the optical surface of the coupling lens, aberration can be corrected based on the first light flux and the second light flux using the diffraction effect.

The optical pickup apparatus of claim 6 is the invention according to claim 5, wherein when light flux with the wavelength $\lambda 1$ passes through the refraction structure, the intensity of the second order refraction light becomes a maximum and when light flux having a wavelength of $\lambda 2$ passes through the refraction structure, the intensity of the first order refraction light becomes a maximum, whereby the radiation angle can be varied in accordance with wavelength.

The optical pickup apparatus of Claim 7 is the invention according to Claim 5, wherein when light flux with the wavelength $\lambda 1$ passes through the refraction structure, the intensity of the zero order refraction light becomes a maximum and when light flux with the wavelength $\lambda 2$ passes through the refraction structure, the intensity of the first order refraction light becomes a maximum, whereby the radiation angle can be varied in accordance with wavelength.

The optical pickup apparatus of Claim 8 is the invention according to any one of Claims 1 to 7, wherein at least one coupling lens is disposed in all of the first optical path through to the third optical path.

The optical pickup apparatus of Claim 9 is the invention according to Claim 8, wherein a diffraction structure is formed on the optical surface of the coupling lens disposed in the first optical path, whereby chromatic aberration is corrected even in the case where the first light flux, for example, deviates from the standard wavelength.

The optical pickup apparatus of Claim 10 is the invention according to any one of Claims 1 to 9, wherein at least one of the first to third optical information has a plurality of information recording surfaces, and because a liquid crystal element that is driven so as impart different aberration states for the spots on the surface of the information recording surface focused by the objective optical element is disposed on one of the first optical path through to the third optical path, recording and/or reproduction of information is suitably performed on the optical information recording media in which multiple layers of information recording surfaces are disposed. "Liquid crystal element" refers to one which imparts a prescribed aberration sate to the light flux which passes through by being driven by power supplied from the outside, and an example is described in Japanese Patent Application Laid-Open No. 2004-192719.

The optical pickup apparatus of Claim 11 is the invention according to any one of Claims 1 to 10 in the scope of the claims, wherein the second objective optical element is optimized for performing recording and/or reproduction of information on the second optical information recording medium. When recording and/or reproduction of information on the third optical information recording medium is performed, the coupling lens or the mechanism for correcting aberration is used to suitably correct the wave front aberration.

The optical pickup apparatus of Claim 12 is the invention according to any one of Claims 1 to 10 in the scope of the claims, wherein the second objective optical element is optimized for performing recording and reproduction of information on the third optical information recording medium. When recording and/or reproduction of information on the second optical information recording medium is performed, the coupling lens or the mechanism for correcting aberration is used to suitably correct the wave front aberration.

The optical pickup apparatus of Claim 13 is the invention according to any one of Claims 1 to 10, wherein the second objective optical element and the third objective optical element are optimized for performing recording and reproduction of information on different provisional optical information recording medium. When recording and/or reproduction of information on the second optical information recording medium and the third optical information recording medium is performed, the coupling lens or the mechanism for correcting aberration is used to suitably correct the wave front aberration and correction amount can be controlled to be small.

The optical pickup apparatus of Claim 14 is the invention according to any one of Claims 1 to the 13, wherein the coupling lens is a beam expander or collimator lens.

The optical pickup apparatus of Claim 15 is the invention according to any one of Claims 1 to 14, wherein the trap pitch TP1 on the information recording surface of the first optical information recording medium, the trap pitch TP2 on the information recording surface of the second optical information recording medium; the trap pitch TP3 on the information recording surface of the third optical information recording medium satisfy the following relationship.

$$TP1 < TP2 < TP3 \qquad (1)$$

The optical pickup apparatus of Claim 1 is the invention according to any one of Claims 1 to 15, wherein at least one of the first objective optical element and the second objective optical element is made of glass.

In the specification of the present invention, the objective optical element when strictly defined indicates an element has focusing effect and is arranged to oppose the optical information recording medium at the position closest to the optical information recording medium side in the state in which an optical information recording medium is loaded in the optical pickup apparatus.

EFFECTS OF THE INVENTION

According to the present invention, an optical pickup apparatus is provided which has a comparatively simple structure and which is capable of information recording and/or reproduction on different optical information recording media with compatibility among these media.

DESCRIPTIONS OF SYMBOLS

ACT Actuator
COL1 First coupling lens
COL2 Second coupling lens
DP Dichroic prism
LD1 First semiconductor laser
LD2 Second semiconductor laser
LH Lens holder
OBJ1 First objective lens
OBJ2 Second objective lens
OD1 First optical disk
OD2 Second optical disk
OD3 Third optical disk
PBS1 First polarized beam splitter
PBS2 Second polarized beam splitter
PBSW Polarized switch
PD1 First optical detector
PD2 Second optical detector
QWP1 First $\lambda/4$ wave plate
QWP2 Second $\lambda/4$ wave plate
SL1 First sensor lens
SL2 Second sensor lens
TP1 Track pitch
TP2 Track pitch
TP3 Track pitch

BEST MODE FOR CARRYING OUT THE INVENTION

The invention is described in more detail in the following with reference to the drawings.

First Embodiment

First, the invention pertaining to the first item of the scope of the claims will be described.

Figure 1:
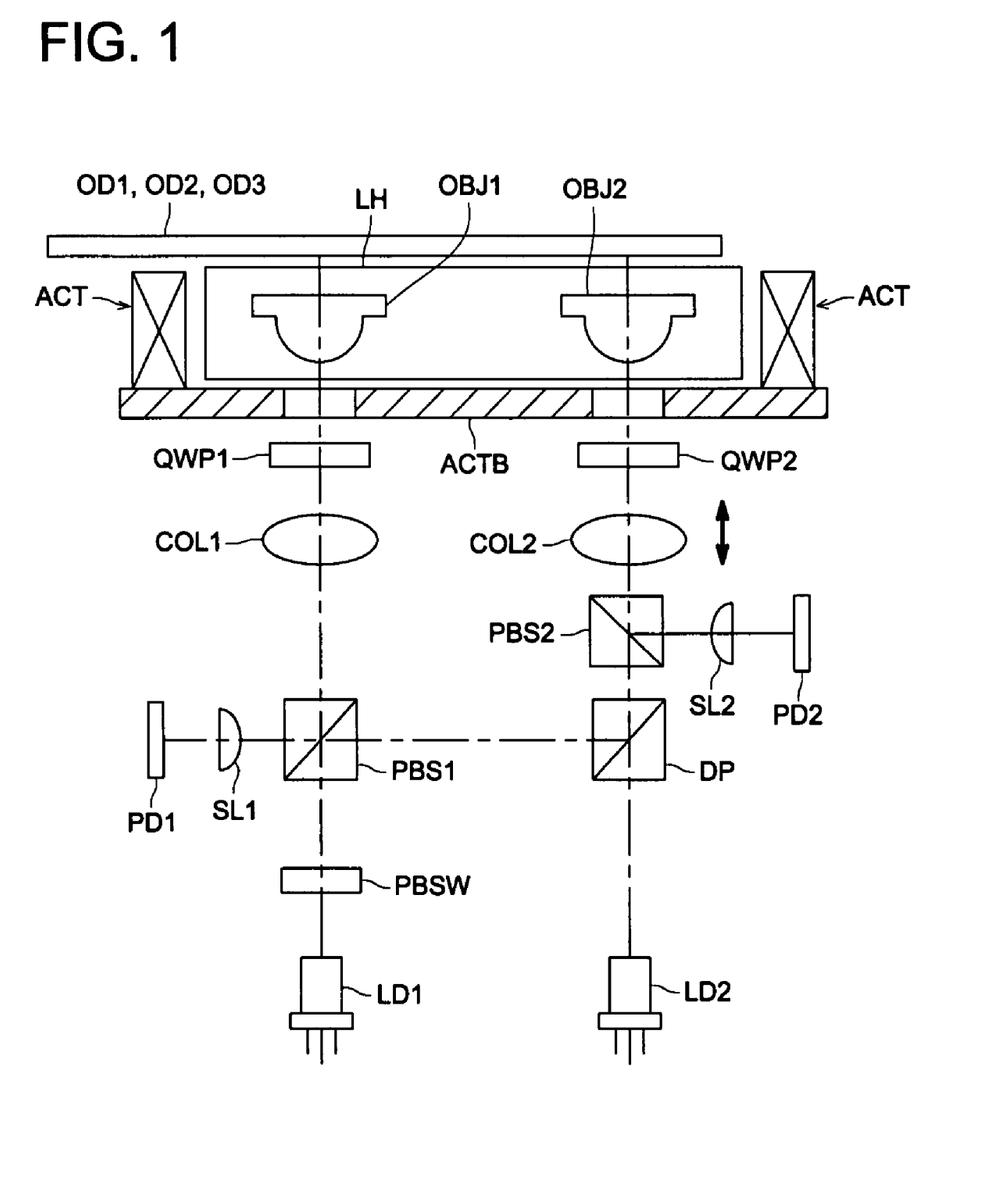
FIG. 1 is a schematic sectional view of the optical pickup apparatus of this embodiment.

FIG. 1 is a schematic sectional view of the first embodiment of the optical device in which performs information recording/reproduction on all of the first optical disk OD1 which is the BD, the second optical disk OD2 which is the HD, the third optical disk OD3 which is the conventional DVD. The BD track pitch TP1, the HD track pitch TP2, DVD track pitch TP3 satisfy the following relationship.

$$TP1 < TP2 < TP3 \qquad (1)$$

As shown in FIG. 1, the lens holder LH which holds the first objective lens (also called first objective optical element) OBJ1 and the second objective lens (also called second objective optical element) OBJ2 which are each made of glass, is supported so as to move at least two-dimensionally by the actuator ACT.

In this embodiment, the polar switch PBSW is provided as the polar switch means. The polar switch PBSW may have a λ/2 wave plate which can be do 90 degree rotation, and in this case, the light flux that has passed through the λ/2 wave plate that is at the 0 degree position for example, becomes P polarized light (first polarized state), and the light flux that has passed through the λ/2 wave plate that is at the 90 degree position becomes S polarized light (second polarized state). It is to be noted that a polar switching means which electrically switches between P polar light and S polar light may also be provided. Furthermore, the second coupling lens COL2 which both the first light flux and second light flux pass through, is driven in the optical axis direction by a driving mechanism which is not shown, and this functions as the mechanism for correcting aberration. It is to be noted that in this example COL2 is a collimator lens. COL2 is also called the second collimator hereinafter.

When parallel light flux having a wavelength of λ3 (λ3=700-800 nm) is entered into the second objective lens OBJ2, the wave front aberration is 0.07λ3 rms or more in the focus spot that is formed on the information recording surface of the CD which is the fourth optical information that has a protective substrate thickness t4 (t4=1.2 mm) and whose track pitch is larger than that of a DVD. That is to say, in this optical pickup apparatus, recording and/or reproduction of information on CD cannot be suitably performed, but the optical system and drive system is simplified.

Of course, even when the second objective lens is used, because the optical axis direction drive distance of the COL2 which is the mechanism for correcting aberration is made large, it is theoretically possible for a favorable focus spot to be formed on the information recording surface of the CD. However, because the drive distance becomes large, the overall pickup becomes large. Furthermore by entering the limited divergent light in the second objective lens, a large amount of coma aberration with respect to the image height at the time of tracking (grazing incidence) is generated and thus this cannot be used in reality. Furthermore, a filter is provided for collimating the light flux, but a diffraction structure must be provided and this leads to high costs.

That is to say, the case will be described where recording and/or reproduction of information is performed on a first optical disc OD1 using a first light flux that takes the path from the first semiconductor laser LD1 to the first objective lens OBJ1. At this time, the polarized beam switch PBSW is set such that the light flux which passes becomes P polarized light. In FIG. 1, the light flux emitted from the first semiconductor laser LD1 (wavelength λ1=380 nm–450 nm) which is the first light source passes through the polarized beam switch PBSW and becomes P polarized light and is thus passed through the first polarized beam splitter PBS1 and entered into the first collimator lens COL1 to become parallel light flux. The parallel light flux that is emitted from the first collimator lens COL1 passes through the first λ/4 wave plate (also referred to as first polarization conversion element) QWP1, and is focused by the first objective lens OBJ1, and then focused on the information recording surface via the first protective substrate (thickness t1=0.1 mm) of the first optical disk OD1 and a focus spot is formed here.

In addition, the light flux that is modulated by the information pit at the information recording surface and then reflected passes through the first objective lens OBJ1 again and then passes the first λ/4 wave plate QWP1 twice to become S polarized light and is then reflected at the first polarized beam splitter PBS1 then passes the first sensor lens SL1 and is entered on the light receiving surface of the first optical sensor PD1, and thus this output signal is used to obtain the reading signal for the information recorded on the optical disk OD1.

Also, changes in light amount due to shape changes and position changes of the spots on the first optical detector PD1 are detected and focusing detection or track detection is performed. Based on this detection, the actuator ACT is driven so as to move the first objective lens OBJ1 along with the lens holder LH such that the light flux from the first semiconductor laser LD1 focuses in the information recording surface of the first optical disk OD1.

The case will be described where recording and/or reproduction of information is performed on a second optical disc OD2 using a first light flux that takes the path from the first semiconductor laser LD1 to the second objective lens OBJ2. At this time, the polarized beam switch PBSW is set such that the light flux which passes becomes S polarized, light. In addition, the second coupling lens COL2 is driven to the first optical axis direction position. In FIG. 1, the light flux emitted from the first semiconductor laser LD1 (wavelength λ1=380 nm-450 nm) which is the first light source passes through the polarized beam switch PBSW and becomes S polarized light and is thus reflected at the polarized beam splitter PBS1, and then reflected at the dichroic prism (also called wavelength selection element) DP and then entered into the second collimator lens COL2 to become parallel light flux. The parallel light flux that is emitted from the second collimator lens COL2 passes through the second λ/4 wave plate QWP2, and is focused by the second objective lens OBJ2, and then focused on the information recording surface via the second protective substrate (thickness t2=0.6 mm) of the second optical disc OD2 and a focus spot is formed here.

In addition, the light flux that is modulated by the information pit at the information recording surface and then reflected, passes through the second objective lens OBJ2 again and then passes the second λ/4 wave plate QWP2 twice to become P polarized light and is then reflected at the second polarized beam splitter PBS2 and is entered on the light receiving surface of the second optical sensor PD2 via the second sensor lens SL2 and thus this output signal is used to obtain the reading signal for the information recorded on the second optical disk OD2.

Also, changes in light amount due to shape changes and position changes of the spots on the second optical detector PD2 are detected and focusing detection or track detection is performed. Based on this detection, the actuator ACT is driven so as to move the second objective lens OBJ2 along with the lens holder LH such that the light flux from the first semiconductor laser LD1 focuses on the information recording surface of the second optical disk OD2.

The case will be described where recording and/or reproduction of information is performed on a third optical disc OD3 using a second light flux that takes the path from the second semiconductor laser LD2 to the second objective lens OBJ2. The second coupling lens COL2 is driven to the second optical axis direction position. In FIG. 1, the light flux emitted in S polar light state from the second semiconductor laser LD2 (wavelength λ2=600 nm-700 nm) which is the second light source passes through the dichroic prism DP and then the second polarized beam splitter PBS2, and then entered into the second collimator lens COL2 to become a prescribed divergent light flux. The light flux that is emitted from the second collimator lens COL2 passes through the second λ/4 wave plate QWP2, and is focused by the second objective lens OBJ2, and then focused on the information recording surface via the protective substrate (thickness t3=0.6 mm) of the third optical disc OD3 and a focus spot is formed here.

In addition, the light flux that is modulated by the information pit at the information recording surface and then reflected, passes through the second objective lens OBJ2 again and then passes the second λ/4 wave plate QWP2 twice to become P polarized light and is then reflected at the second polarized beam splitter PBS2 and is entered on the light receiving surface of the second optical sensor PD2 via the second sensor lens SL2 and thus this output signal is used to obtain the reading signal for the information recorded on the third optical disk OD3.

Also, changes in light amount due to shape changes and position changes of the spots on the second optical detector PD2 are detected and focusing detection or track detection is performed. Based on this detection, the actuator ACT is driven so as to move the second objective lens OBJ2 along with the lens holder LH such that the light flux from the second semiconductor laser LD2 focuses on the information recording surface of the third optical disk OD3.

It is to be noted that in the case where the first optical disk through to the third optical disk have a plurality of information recording surfaces, the first coupling lens COL1 and the second coupling lens COL2 are displaced in the optical axis direction and thus recording and/or reproduction of information on any of the information recording surfaces become possible.

As described above, because the optical surface of the first objective lens OBJ1 and the optical surface of the second objective lens OBJ2 are formed only from refractive surface, they can be formed at low cost even if made from glass. For this reason, it is not affected by refraction rate change due to temperature change. Furthermore, the first objective lens OBJ1 can be designed so as to be optimized for the first light flux having wavelength λ1 and the protective substrate t1 of the first optical disk OD1, and thus recording and/or reproduction of information can be suitably performed on the first optical disk OD1. Meanwhile, the second objective lens OBJ2 use both the first light flux having a wavelength of λ1 and the second light flux having a wavelength of λ2, but in the case where the protective substrate t2 of the second optical disk OD2 and the protective substrate t3 of the third optical information recording medium are the same, it is not necessary to take the difference in thickness of the protective substrates into consideration, and thus designing becomes simple and cost is low. It is to be noted that chromatic aberration based on the difference in wavelength between the first light flux and the second light flux is suitably corrected by displacing the second coupling lens COL2 (or beam expander) to thereby displace the divergence angle to the second objective lens OBJ2. Furthermore, the mechanism for correcting aberration may be one which also corrects other factors. A structure is possible in which other factors such as correction of difference in oscillation wavelength of each laser diode (so-called wavelength characteristics) due to manufacturing lots or correction of aberration caused by increase in temperature during use (temperature correction) is favorably performed.

Instead of displacing the second coupling lens COL2 in the axial direction, a diffraction structure may be formed on the optical surface. In this case, in the first light flux and second light flux which pass through the diffraction structure by causing the intensity of the diffracted light of different respective orders to be a maximum, different radiation angles can be imparted and function as a mechanism for correcting aberration which imparts different aberration states becomes possible. It is to be noted that instead of displacing the second coupling lens COL2 in the optical direction or providing the diffraction structure, the second coupling lens COL2 may be assembled integrally with the objective lens or a liquid crystal element, or the like may be used separately from the objective lens.

Furthermore, when a diffraction structure is provided at the first coupling lens COL1, even in the case where the first light flux deviates from the standard wavelength aberration difference is suitably corrected.

Second Embodiment

Furthermore, the mechanism for correcting aberration may be one which also corrects other factors. A structure is possible in which other factors such as correction of difference in oscillation wavelength of each laser diode (so-called wavelength characteristics) due to manufacturing lots or correction of aberration caused by increase in temperature during use (temperature correction) is favorably performed.

In addition, the structure is basically the same as the invention according to Claim 1, but there is a big difference in that a diffraction structure is provided on the optical surface of the second objective lens OBJ2. The effect if this diffraction structure will be described hereinafter.

On one hand, when parallel light flux having a wavelength of λ3 (λ3=700-800 nm) is entered into the second objective lens OBJ2, the wave front aberration is 0.07λ3 rms or more in the focus spot that is formed on the information recording surface of the CD which is the fourth optical information that has a protective substrate thickness t4 (t4=1.2 mm) and whose track pitch is larger than that of a DVD. That is to say, in this optical pickup apparatus, recording and/or reproduction of information on CD cannot be suitably performed, but the optical system and drive system is simplified, and the second embodiment is the same as the first embodiment in this respect. Also, similarly, by limited divergence of the incident light flux magnification, it is theoretically possible for a favorable focus spot to be formed on the information recording surface of the CD. Since formation of the focus spot on the first optical disk OD1 is the same as in the first embodiment, a description thereof will be omitted, and the operation of forming the focus spit on the second optical disk and the third optical disk will be described.

Due to the operation of the polarized beam switch PBSW, the first light flux which takes the second optical path and arrives from the first semiconductor laser LD1 from to the second objective lens OBJ2 forms a focus spot on the information recording surface of the second optical disk OD2 and information recording and/or reproduction is done. The operation of the polarized light switch PBSW is the same as that of the first embodiment. Meanwhile, the second light flux which takes the third optical path from the second semiconductor laser LD2 and arrives at the second objective lens OBJ2 and forms a focus spot on the information recording surface of the third optical disk OD3 and information recording and/or reproduction is performed.

In this case, because the thickness of the protective substrate is the same for the second optical disk OD2 and the third optical disk OD3, spherical aberration based on difference in the thickness of the substrate does not occur, but chromatic aberration based on the difference in substrate thickness does not occur, but chromatic aberration based on the difference in the wavelengths occurs. In the first embodiment, this problem is solved by moving the second coupling lens COL2 in the optical direction, but the in the second embodiment, this effect is imparted by providing a diffraction structure in the second objective lens OBJ2.

In the first light flux and the second light flux which passes the diffraction structure provided in the second objective lens OBJ2, by maximizing the intensity of the diffracted light of each different orders, different radiation angles can be imparted and thus different aberration states can be imparted. It is to be noted that in the case where the optical disk has a multilayer structure, it is possible for the second coupling lens COL2 to be displaced in the optical direction in order to switch between the layers. The second coupling lens COL2 may be assembled integrally with the objective lens or a liquid crystal element or the like may be used separately from the objective lens.

Furthermore, if the diffraction structure is provided in first coupling lens COL1, in the case where the first light flux deviates from the standard wavelength, aberration difference is suitably corrected.

In addition, the optical axis direction position of the second coupling lens COL2 which is the aberration correction mechanism is preferably a different position in the case where the second optical disk OD2 performs recording and reproduction and in the case where the third optical disk OD3 performs recording and reproduction in order to the assist the action of the second objective lens OBJ2 or alternatively to prevent the diffraction structure from becoming small.

In addition, in the case where chromatic aberration is corrected only by the diffraction structure of the second objective lens OBJ2, the aberration correction mechanism can be more favorably used for correcting other factors. A structure is possible in which other factors such as correction of difference in oscillation wavelength of each laser diode (so-called wavelength characteristics) due to manufacturing lots or correction of aberration caused by increase in temperature during use (temperature correction) is favorably performed.

It is to be noted that the second objective lens OBJ2 can be used in both the second optical disk (HD DVD) and the third optical disk (DVD), but in the case where it is formed from only a refractive surface as well as in the case where it also has a diffraction surface, the optimized optical disk can be suitably selected. In the case where it is optimized for the second optical disk (HD DVD), it can be made usable in the third optical disk (DVD) by the operation of the aberration correction mechanism or diffraction surface. This case is advantageous in that formation of a more favorable focus spot on the HD DVD occurs easily. The opposite case is also possible.

Also, in the case where a substrate thickness which is in between these two is selected and an optical surface is designed for this substrate thickness and then made usable in both optical disks by the action of the aberration correction mechanism or the diffraction surface, a diffraction structure is provided in the objective lens and is preferably used in the case where the focus spot is formed by generating diffracted light of an order which is not 0 from one of both optical disks.

EXAMPLE

The following is a preferable example of the first embodiment.

In this aspect, the first objective lens OBJ1 preferably uses the design described in U.S. Pat. Nos. 6,411,442 and 6,512,640 (both with Japanese priority and Application No. 11-247294 and No. 2000-60843) which are by the applicants of this application.

In addition, the second objective lens OBJ2 preferably uses the design in Japanese Patent Application Laid-Open 2004-101823 by the applicants of this application.

It is to be noted that the HD DVD objective lens described in Japanese Patent Application Laid-Open 2004-101823 has a diffraction structure for wavelength characteristic correction, but those which do not have color correction function may have an optical design which is formed only from a refractive surface using a known technique.

Next, a preferable example of the second embodiment will be described. It is to be noted that in the following (including the lens data in the chart), the multiple of a power of 10 (for example $2.5 \times 10^{-3}$ is shown using E (for example 2.5×E−3).

The optical surface of the objective optical system are defined by the mathematical expression in which the coefficients shown in the table are each substituted in equation 1, and an axially symmetric aspherical surface is formed in the vicinity of the optical axis. Given that the optical axis position herein is X, the height in the vertical direction of the optical axis is h, the bend radius of the optical surface is r, the cone coefficient is $\kappa$, and the aspherical surface coefficient is $A_{2i}$.

$$X = \frac{h^2/r}{1+\sqrt{1-(1+\kappa)h^2/r^2}} + \sum_{i=2} A_{2i}h^{2i} \qquad \text{[Equation 1]}$$

In the case where the diffraction structure (phase structure) is used, the optical path difference that is imparted to the light flux of each wavelength using this structure is defined by the mathematical expression in which the coefficients shown in the table are each substituted in the optical path difference function of Equation 2. That is to say, the optical path difference function $\Phi B(mm)$ is shown in Equation 2 given that the height in the vertical direction of the optical axis is h, the diffraction coefficient is m, the wavelength (outgoing wavelength for the semiconductor laser) used is $\lambda$, the blazed wavelength is $\lambda B$ and the optical path difference function coefficient is C.

$$\Phi_B = m \times \frac{\lambda}{\lambda_B} \times \sum_{i=1}^{5} C_{2i}h^{2i} \qquad \text{[Equation 2]}$$

The lens data of the first objective lens OBJ1 (including objective lens focal distance, image surface side numerical aperture and magnification) are shown in Table 1. The optical surface of the first objective lens is formed only from the refractive surface.

TABLE 1

Lens data of the first objective lens
Focal distance $f_1$ = 2.2 mm
Image surface side numerical aperture NA1: 0.85
Magnification m1: 1/23.3

| "ith" surface | ri | di (408 nm) | ni (408 nm) |
|---|---|---|---|
| 0 | | −50 | |
| 1 (Aperture diameter) | ∞ | 0.1 (φ3.65 mm) | |
| 2 | 1.37808 | 2.60000 | 1.524461 |
| 3 | −2.48805 | 0.62 | 1.0 |
| 4 | ∞ | 0.0875 | 1.61829 |
| 5 | ∞ | | |

Aspherical data

Surface 2
Aspherical coefficient $\kappa$ = −6.6478 × E−1
A1 = +1.1830 × E−2
A2 = +2.1368 × E−3
A3 = +6.0478 × E−5
A4 = +4.1813 × E−4
A5 = −2.1208 × E−5

TABLE 1-continued

Lens data of the first objective lens
Focal distance $f_1$ = 2.2 mm
Image surface side numerical aperture NA1: 0.85
Magnification m1: 1/23.3

A6 = −2.7978 × E−5
A7 = +1.0575 × E−5
A8 = +1.8451 × E−6
A9 = −4.8060 × E−7
Surface 3
Aspherical coefficient κ = −5.7511 × E+1
A1 = +8.1811 × E−2
A2 = −4.7203 × E−2
A3 = +9.3444 × E−3
A4 = +1.6660 × E−3
A5 = −7.2478 × E−4

Note:
"di" is the displacement from the "ith" surface to the "(i + 1)th" surface The lens data (including objective lens focal distance, image surface side numerical aperture and magnification) of the second objective lens OBJ2 is shown in Table 2 and the aspherical surface data is shown in Table 3. The diffraction structure which imparts a similar effect on the light flux may be provided in the coupling lens for example, as described above. In addition, in this example, by changing the magnification of the coupling lens, more favorable focus spot formation can be performed.

It is to be noted that as shown in Table 2 and Table 3, when parallel light flux having a wavelength of $\lambda 3$ ($\lambda 3$=700-800 nm) is entered into the second objective lens OBJ2, the wave front aberration is 0.178$\lambda 3$ rms in the focus spot that is formed on the information recording surface of the CD which is the fourth optical information that has a protective substrate thickness t4 (t4=1.2 mm) and whose track pitch is larger than that of a DVD.

TABLE 2

Lens data of the second objective lens
Focal distance $f_1$ = 3.00 mm $f_2$ = 3.10 mm
Image surface side numerical
aperture NA1: 0.65 NA2: 0.65
Surface 2 diffraction order n1: 10 n2: 6
Surface 2' diffraction order m1: 5 n2: 3
Magnification m1: 1/31.0 m2: 1/34.3

| "ith" surface | ri | di (407 nm) | ni (407 nm) | di (655 nm) | ni (655 nm) |
|---|---|---|---|---|---|
| 0 |  | −90.00 |  | −166.02 |  |
| 1 (Aperture diameter) | ∞ | 0.01 (φ3.964 mm) |  | 0.01 (φ3.964 mm) |  |
| 2 | 1.92355 | 1.65000 | 1.559806 | 1.65000 | 1.540725 |
| 2' | 1.98118 | 0.00583 | 1.559806 | 0.00583 | 1.540725 |
| 3 | −16.03440 | 1.55 | 1.0 | 1.67 | 1.0 |
| 3' | −13.18912 | 0.00000 | 1.0 | 0.00000 | 1.0 |
| 4 | ∞ | 0.6 | 1.61869 | 0.6 | 1.57752 |
| 5 | ∞ |  |  |  |  |

Note:
"di" is the displacement from the "ith" surface to the "(i + 1)th" surface
"d2'" and "d3'" respectively express the displacement from surface 2 to surface 2' and from surface 3 to surface 3', respectively.

TABLE 3

Aspherical data

Surface 2
(0 < h ≤ 1.662 mm)
Aspherical coefficient

κ = −4.4662 × E−1
A1 = +8.7126 × E−3
A2 = −1.9063 × E−3
A3 = +9.2646 × E−4
A4 = −2.1198 × E−4
A5 = +1.6273 × E−7
A6 = +1.3793 × E−6
Optical path difference
function (blazed wavelength $\lambda_B$ = 0.1 mm)

C2 = −2.3141 × E−1
C4 = −2.0141 × E−2
C6 = −7.5021 × E−3
C8 = +1.3559 × E−3
C10 = −4.0867 × E−4
Surface 2' (1.662 mm < h)
Aspherical coefficient κ = −4.1961 × E−1
A1 = +3.0725 × E−3
A2 = −2.5861 × E−3
A3 = +9.6551 × E−4
A4 = −1.3826 × E−4
A5 = +7.5482 × E−6
A6 = −7.5795 × E−7
Optical path difference
function (blazed wavelength $\lambda_B$ = 0.1 mm)

C2 = −5.4710 × E−1
C4 = −2.6404 × E−2
C6 = −1.5524 × E−2
C8 = −1.0308 × E−3
C10 = +1.1379 × E−3
Surface 3
(0 < h ≤ 1.362 mm)
Aspherical coefficient κ = −8.0653 × E+2
A1 = −5.5926 × E−3
A2 = +1.1660 × E−2
A3 = −6.4291 × E−3
A4 = +1.5528 × E−3
A5 = −1.3029 × E−4
A6 = −3.4460 × E−6
Surface 3' (1.362 mm < h)
Aspherical coefficient κ = −1.2782 × E+3
A1 = −7.3881 × E−3
A2 = +1.1800 × E−2
A3 = −6.0862 × E−3
A4 = +1.6068 × E−3
A5 = −2.3565 × E−4
A6 = +1.5370 × E−5

The invention claimed is:

1. An optical pickup apparatus comprising:
a first light source to emit a light flux with a wavelength $\lambda 1$;
a second light source to emit a light flux with a wavelength $\lambda 2$ ($\lambda 1 < \lambda 2$);
a first objective optical element provided with an optical surface consisting of a refractive surface;
a second objective optical element provided with an optical surface consisting of a refractive surface;
wherein the first light flux with the wavelength $\lambda 1$ emitted from the first light source is converged by the first objective optical element, and a converged light spot can be formed on an information recording surface of a first optical information recording medium with a protective substrate thickness t1, and also the first light flux with the wavelength λ1 emitted from the first light source is converged by the second objective optical element, and a converged light spot can be formed on an information recording surface of a second optical information recording medium with a protective substrate thickness of t2 (t2>t1), and further the second light flux with the wavelength of λ2 emitted from the second light source is converged by the second objective optical element, and a converged light spot can be formed on the information recording surface of a third optical information recording medium having a protective substrate thickness of t3(0.9t2≦t3≦1.1t2) and a track pitch which is larger than that of the second optical information recording medium;

wherein the optical pickup apparatus further comprising:

a first optical path which leads the first light flux to the first objective optical element;

a second optical path which leads the first light flux to the second objective optical element; and a third optical path which leads the second light flux to the second objective optical element;

wherein the first optical path that is provided between the first light source and the first objective optical element has a polarized beam switching means and a first polarized beam splitter;

the second optical path that is provided between the first light source and the second objective optical element has the polarized beam switching means, the first polarized beam splitter, a wavelength selective element, and an aberration correction mechanism;

the third optical path that is provided between the second light source and the second objective optical element has the wavelength selective element, and the aberration correction mechanism; and wherein when converged light spot formation is performed on the information recording surface of the first optical information recording medium via the first objective optical element using the first light flux, the first light flux emitted from the first light source is put in the first polarized state by the polarized beam switching means by being passed through the first polarized beam splitter and entered into the first objective optical element;

wherein when converged light spot formation is performed on the information recording surface of the second optical information recording medium via second objective optical element using the first light flux, by putting the first light flux emitted from the first light source in the second polarized state using the polarized beam switching means, the first light flux is reflected at the first polarized beam splitter and then reflected at the wavelength selective element, and then put in a first aberration state by being passed through the aberration correcting mechanism and then entered into the second objective optical element;

wherein when converged light spot formation is performed on the information recording surface of the third optical information recording medium via second objective optical element using the second light flux, by passing the second light flux emitted from the second light source through the wavelength selective element and then through the aberration correction mechanism, the second light flux is put in a second aberration state and then entered into the second objective optical element, and wherein when a parallel light flux with a wavelength λ3 (1.7λ1≦λ3≦2.3λ1) is made to be incident on the second objective optical element, the wavefront aberration is 0.07λ3 rms or more in the converged light spot formed on an information recording surface of a fourth information recording medium in which the protective substrate thickness is t4 (t4>t3) and the track pitch is larger than that of the third information recording medium.

2. The optical pickup apparatus of claim 1, wherein a first polarization conversion element is provided between the first polarized beam splitter and the first objective optical element in the first optical path;

a second polarized beam splitter is provided between the wavelength selecting element and the second objective optical element, and a second polarization conversion element is provided between the second polarized beam splitter and the second objective optical element in the second optical path and the third optical path;

the light flux emitted from the second light source is in the first polarized state; and when converged light spot formation is performed on the information recording surface of the first optical information recording medium via the first objective optical element using the first light flux, the first light flux reflected from the information recording surface of the first information recording medium is put into the second polarized state by a first polarization conversion element and then reflected at the first polarized beam splitter and entered into the first optical detector;

when focus spot formation is performed on the information recording surface of the second optical information recording medium via the second objective optical element using the first light flux, the light flux reflected from the information recording surface of the second objective optical element is put into the first polarized state by being passed through the second polarization conversion element and then reflected at the second polarized beam splitter and entered into the second optical detector; and when focus spot formation is performed on the information recording surface of the third optical information recording medium via the second objective optical element using the second light flux, the light flux reflected from the information recording surface of the second objective optical element is put into the first polarized state by being passed through the second polarization conversion element and then reflected at the second polarized beam splitter and entered into the second optical detector.

3. The optical pickup apparatus according to claim 1, wherein the aberration correcting mechanism includes a coupling lens which displaces in the optical axis direction.

4. The optical pickup apparatus according to claim 1, wherein the aberration correcting mechanism includes a diffraction structure which is formed on the optical surface of the coupling lens.

5. The optical pickup apparatus of claim 4, wherein when light flux with a wavelength λ1 passes through the diffraction structure formed on the optical surface of the coupling lens, the intensity of the second order diffracted light becomes a maximum and when light flux with a wavelength λ2 passes through the diffraction structure, the intensity of the first order diffracted light becomes a maximum.

6. The optical pickup apparatus of claim 4, wherein when light flux with a wavelength λ1 passes through diffraction structure formed on the optical surface of the coupling lens, the intensity of the zero order diffracted light becomes a maximum and when light flux with a wavelength λ2 passes through the diffraction structure, the intensity of the first order diffracted light becomes a maximum.

7. The optical pickup apparatus according to claim 1, wherein at least one coupling lens is disposed in all of the first optical path through to the third optical path.

8. The optical pickup apparatus of claim 7, wherein a diffraction structure is formed on the optical surface of the coupling lens disposed in the first optical path.

9. The optical pickup apparatus according to claim 1, wherein at least one of the first to third optical information recording medium has a plurality of information recording surfaces, and a liquid crystal element that is driven so as to impart different aberration states for the spots on the surface of the information recording surface converged by the objective optical element is disposed on one of the first optical path through to the third optical path.

10. The optical pickup apparatus according to claim 1, wherein the second objective optical element is optimized for performing recording and/or reproduction of information on the second optical information recording medium.

11. The optical pickup apparatus according to claim 1, wherein the second objective optical element is optimized for performing recording and reproduction of information on the third optical information recording medium.

12. The optical pickup apparatus according to claim 1, wherein the second objective optical element is optimized for performing recording and reproduction of information on a provisional optical information recording medium different from the second optical information recording medium and the third optical information recording medium.

13. The optical pickup apparatus according to claim 1, wherein the coupling lens is a beam expander or collimator lens.

14. The optical pickup apparatus according to claim 1, wherein a trap pitch TP1 on the information recording surface of the first optical information recording medium, a trap pitch TP2 on the information recording surface of the second optical information recording medium; a trap pitch TP3 on the information recording surface of the third optical information recording medium satisfy the following relationship $$TP1<TP2<TP3 \qquad (1).$$

15. The optical pickup apparatus according to claim 1, wherein at least one of the first objective optical element and the second objective optical element is made of glass.

16. An optical pickup apparatus comprising:
a first light source to emit a light flux with a wavelength λ1;
a second light source to emit a light flux with a wavelength λ2 (λ1<λ2);
a first objective optical element provided with an optical surface consisting of a refractive surface
a second objective optical element provided with an optical surface having a diffractive surface, and the first light flux with the wavelength λ1 emitted from the first light source is converged by the first objective optical element, and a converged light spot can be formed on an information recording surface of a first optical information recording medium with a protective substrate thickness of t1 and also the first light flux with the wavelength λ1 emitted from the first light source is converged by the second objective optical element, and a converged light spot can be formed on an information recording surface of a second optical information recording medium with a protective substrate thickness t2 (t2>t1), and further the second light flux with the wavelength λ2 emitted from the second light source is converged by the second objective optical element, and a converged light spot can be formed on an information recording surface of a third optical information recording medium having a protective substrate thickness t3(0.9t2≦t3≦1.1t2) and a track pitch which is larger than that of the second information recording medium;

wherein the optical pickup apparatus further comprising:
a first optical path which leads the first light flux to the first objective optical element;
a second optical path which leads the first light flux to the second objective optical element; and
a third optical path which leads the second light flux to the second objective optical element; wherein the first optical path that is provided between the first light source and the first objective optical element has a polarized beam switching means and a first polarized beam splitter;
the second optical path that is provided between the first light source and the second objective optical element has the polarized beam switching means, the first polarized beam splitter, a wavelength selective element, and a aberration correcting mechanism;
the third optical path that is provided between the second light source and the second objective optical element has a wavelength selective element, and the aberration correcting mechanism; and
wherein when converged light spot formation is performed on the information recording surface of the first optical information recording medium via the first objective optical element using the first light flux, by putting the first light flux emitted from the first light source in the first polarized state using the polarized beam switching means, the first light flux enters into the first objective optical element via the first polarized beam splitter;
wherein when converged light spot formation is performed on the information recording surface of the second optical information recording medium via second objective optical element using the first light flux, by putting the first light flux emitted from the first light source in the second polarized state using the polarized beam switching means, the first light flux is reflected at the first polarized beam splitter and then reflected at the wavelength selective element, and then put in the first aberration state by being passed through the aberration correcting mechanism and then entered into the second objective optical element;
wherein when converged light spot formation is performed on the information recording surface of the third optical information recording medium via second objective optical element using the second light flux, by passing the second light flux emitted from the second light source through the wavelength selective element and then through the aberration correcting mechanism, the second light flux is put in a second aberration state and then entered into the second objective optical element, and
wherein when a parallel light flux with a wavelength λ3 (1.7λ1≦λ3≦2.3λ1) is made to be incident on the second objective optical element, the wavefront aberration is 0.07λ3 rms or more in the converged light spot formed on an information recording surface of a fourth information recording medium in which the protective substrate thickness is t4 (t4>t3) and the track pitch is larger than that of the third information recording medium.

* * * * *